United States Patent [19]

Chan et al.

[11] Patent Number: 4,824,217

[45] Date of Patent: Apr. 25, 1989

[54] COMPOUNDS FOR FERROELECTRIC LIQUID CRYSTAL DEVICES

[75] Inventors: Lawrence K. M. Chan, Hull; David Coates, Bishop's Stortford; Peter A. Gemmell, Runcorn; George W. Gray, Cottingham; David Lacey; Kenneth J. Toyne, both of Hull; Daniel J. S. Young, Doncaster; Matthew F. Bone, Bishop's Stortford; Adam Jackson, Hull; Richard M. Scrowston, Walkington, all of England

[73] Assignee: The Secretary of State for Defence in Her Britannic Majesty's Government of the United Kingdom of Great Britain and Northern Ireland, London, England

[21] Appl. No.: 890,844

[22] PCT Filed: Nov. 8, 1985

[86] PCT No.: PCT/GB85/00511

§ 371 Date: Aug. 19, 1986

§ 102(e) Date: Aug. 19, 1986

[87] PCT Pub. No.: WO86/02937

PCT Pub. Date: May 22, 1986

[30] Foreign Application Priority Data

Oct. 9, 1985 [GB] United Kingdom ............... 8524879

[51] Int. Cl.$^4$ ..................... G02F 1/13; C09K 19/52; C09K 19/12; C07C 101/02
[52] U.S. Cl. ..................... 350/350.5; 252/299.01; 252/299.65; 252/299.66; 560/39; 560/41
[58] Field of Search ............ 252/299.01, 299.65, 252/299.66; 350/350.5; 560/39, 41

[56] References Cited

U.S. PATENT DOCUMENTS

| | | | |
|---|---|---|---|
| 4,293,193 | 10/1981 | Lakes et al. | 252/299.66 |
| 4,394,070 | 7/1983 | Brown et al. | 252/299.01 |
| 4,460,492 | 7/1984 | Lakes et al. | 252/299.01 |

(List continued on next page.)

FOREIGN PATENT DOCUMENTS 156726 10/1985 European Pat. Off. ........ 252/299.65

OTHER PUBLICATIONS

Chilaya et al., Mol. Cryst. Liq. Cryst., vol. 106, pp. 67–71 (1984).
Goodby et al., Mol. Cryst. Liq. Cryst., vol. 110, pp. 175–203 (1984).
Kunitake et al., J. Chemical Soc., Chem. Commun., vol. 9, pp. 655–656 (1986).

Primary Examiner—Teddy S. Gron
Assistant Examiner—J. E. Thomas
Attorney, Agent, or Firm—Nixon & Vanderhye

[57] ABSTRACT

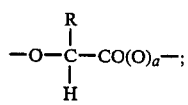

(I)

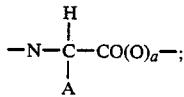

(II)

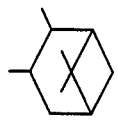

(III)

Ferroelectric smectic liquid crystal mixtures are provided consisting of two constituents; a smectic host and another containing a chiral compound in which rotation of the chiral center relative to the molecular core is sterically hindered, so that the chiral compound induces a high Ps in the mixture. A preferred class of chiral compounds is those derived from naturally occurring compounds with chiral groups, especially α-hydroxycarboxylic acids, amino acids and terpenoids, e.g. with chiral groups (I), (II), (III). The chiral group is incorporated into a compound containing a mesogenic combination of groups, e.g. with chains of cyclic groups and some mesogenic combinations are described.

10 Claims, 1 Drawing Sheet

U.S. PATENT DOCUMENTS

| | | | |
|---|---|---|---|
| 4,576,732 | 3/1986 | Isogai et al. | 252/299.65 |
| 4,596,667 | 6/1986 | Inukai et al. | 252/299.65 |
| 4,600,526 | 7/1986 | Gallot et al. | 252/299.01 |
| 4,613,209 | 9/1986 | Goodby et al. | 252/299.66 |
| 4,622,165 | 11/1986 | Kano et al. | 252/299.65 |
| 4,650,600 | 3/1987 | Hepple et al. | 252/299.01 |
| 4,668,829 | 5/1987 | Walba | 252/299.01 |
| 4,705,874 | 11/1987 | Walba et al. | 252/299.66 |
| 4,753,752 | 6/1988 | Raynes et al. | 252/299.65 |
| 4,764,619 | 8/1988 | Gunjima et al. | 252/299.65 |
| 4,769,176 | 9/1988 | Bradshaw et al. | 252/299.65 |
| 4,775,223 | 10/1988 | Yoshinaga et al. | 252/299.01 |
| 4,784,793 | 11/1988 | Coates et al. | 252/299.01 |

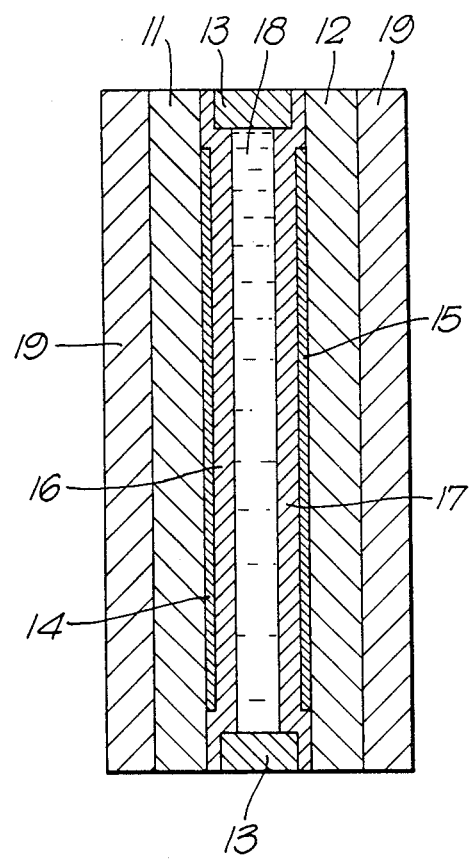

COMPOUNDS FOR FERROELECTRIC LIQUID CRYSTAL DEVICES

This invention relates to liquid crystal compounds and to mixtures which exhibit ferroelectric properties.

The first work on ferroelectric switching liquid crystal display devices by N. A. Clark and S. T. Lagerwall reported in Applied Physics Letters Vol. 36 No. 11 pp 899-901 (June, 1980) (Reference 1) used DOBAMBC or HOBACPC as the ferroelectric liquid crystal. These materials are, for most applications, far from ideal because they are relatively unstable chemically and sensitive to light, their spontaneous polarisation coefficients are relatively small, and their tilted smectic phases are at inconveniently high temperatures and exist over inconveniently small temperature ranges.

This invention is concerned with the provision of ferroelectric liquid crystal mixtures having larger coefficients of spontaneous polarisation ($P_s$) and improved temperature range of tilted smectic phases.

We believe that the relatively small values of $P_s$ exhibited by DOBAMBC and HOBACPC result at least in large part from the relatively free rotation in these molecules of the chiral group with respect to the conjugated core region. It is suggested that a molecule with the same or similar polarity group on its chiral centre should, in the absence of conflicting factors, exhibit enhanced spontaneous polarisation if the structure of the molecule is modified to increase the steric hindrance to hinder the rotation of the chiral group. However, it is usually the case that the means by which such increased steric hindrance can be achieved militates against the formation of liquid crystal phases, particularly those with a relatively wide temperature range.

BRIEF DESCRIPTION OF THE DRAWING

The FIGURE represents a liquid crystal electrooptical display device.

The present invention is therefore directed to ferroelectric liquid crystal mixtures having two major constituents neither of which on its own necessarily exhibits any spontaneous polarisation. One of these two constituents, which does not on its own necessarily exhibit any tilted smectic phase, and hence it does not on its own necessarily have to exhibit any spontaneous polarisation, is a chiral material that exhibits a high degree of steric hindrance of the chiral group of its molecule with respect to the main core of that molecule. The second constituent is provided by a material that is compatible with the first constituent and exhibits a tilted smectic phases, C, I, F, J, K, G, H or X, over an acceptably wide temperature range. This second material does not necessarily contain any chiral centre in its molecular structure and hence it likewise does not on its own necessarily have to exhibit any spontaneous polarisation. These two constituents act co-operatively in the mixture, with the second constituent serving to provide the requisite tilted smectic phase of a ferroelectric smectic, while the first constituent provides the requisite chirality.

According to the present invention in a first aspect there is provided a ferroelectric smectic liquid crystal mixture in which a first constituent of the mixture is chiral, which first constituent is admixed with a second constituent which exhibits a tilted smectic phase, wherein the first constituent consists of one or more compounds having a molecular structure in which the chiral group of the molecule is sterically hindered with respect to the main core of that molecule, preferably to the extent that the transverse polarisation of the molecules of the first constituent produces, in the mixture, a spontaneous polarisation with a maximum value which exceeds 10 $nCcm^{-2}$. Such mixtures will subsequently be referred to as 'two constituent ferroelectric mixtures as hereinbefore defined.'

The maximum value of Ps in such mixtures is ideally at least 20 $nCcm^{-2}$, and may be significantly greater than this, particularly in tilted smectic phases that are more ordered than the smectic C (Sc) phase.

In the absence of effective steric hindrance, the chiral group will not be entirely free to rotate when the first constituent is admixed with the smectic second constituent, and therefore the transverse component of polarisation associated with the chiral centre does in fact confer some spontaneous polarisation to the mixture. We have found however, that, in the presence of significant steric hindrance tending to lock the rotation of the chiral group to that of the main core of the molecule, the value of spontaneous polarisation is much increased. From this observation it is believed that, when significant steric hindrance is present, any transverse polarisation associated with polar substituents at locations of the molecule other than at the chiral group should also make a contribution to the attainment of a high value of spontaneous polarisation. In this context it is important to note that it is generally easier to incorporate highly polar substituents at sites elsewhere than on the chiral group, and that in many instances it is possible to provide more than one such substituent, and to locate them such that their effect is additive.

One of the particular advantages of the use of the two distinct constituents of the ferroelectric smectic mixture is that it eases the problem of obtaining a material that will exhibit a high $P_s$ over a relatively wide temperature range. The molecular form of the first constituent can be structured with the primary aim of providing a large transverse polarisation notwithstanding the fact that this is liable to militate against a wide temperature range of tilted smectic phase (if indeed such a phase is ever present in the material). Correspondingly the second constituent, the host material, can be formulated with the primary aim of providing the mixture with a wide temperature range of tilted smectic phase to cover the required service temperature range.

From the attainment of relatively high $P_s$ values attributed to a reduction of the free rotation of the chiral centre with respect to the main core of the molecule, it follows that, if rotation is significantly reduced, then there is no longer any intrinsic need to provide a chiral centre which has a strong dipole moment. The dipole can advantageously be incorporated into the core of the molecule. This has several advantages including the ease of synthesis, the option to use more than one polar group, and generally a greater chemical stability. In connection with the last mentioned factor it will be noted that, for example, in general alkyl chlorides are far less chemically stable than aryl chlorides.

One particular way of reducing the free rotation of the chiral group is to locate the chiral centre as close as possible to the main core of the molecule, for instance by having it directly bonded to the carboxyl group of the aromatic acid part of an ester.

Another method of reducing the free rotation of the chiral group relative to the main core of the molecule is by means of steric hindrance between the chiral group and the main core. This can be achieved by having bulky or polar substituent groups on the chiral group and/or on the main molecular core which interfere with free rotation.

The phenomenon of steric hindrance is well known in other fields of chemistry, and the synthesis of a molecule which has a chiral centre the free rotation of which relative to the molecular core is sterically hindered will be relatively straightforward to a competent chemist and routes may be devised from literature.

Many compounds which could otherwise be contemplated for use as first constituents of two component mixture as hereinbefore defined suffer from a number of disadvantages. Among these are price and the difficulty of achieving optical purity during synthesis. Although one may start from optically pure (+) or (−) enantiomers, some racemisation may occur during the synthesis. Such racemised products are less effective, sometimes wholly ineffective, in producing chiral smectic phases. Resolution of a racemised product may often be very difficult.

According to a second aspect of the present invention therefore, a two constituent ferroelectric mixture as hereinbefore defined is provided which contains in its first constituent at least one derivative of a naturally occuring chiral compound. The term 'naturally occurring' means available from animal or vegetable sources.

This second aspect of the invention makes use of the fact that a number of groups of naturally occuring molecules posess chiral centres either at individual carbon atoms or at groups within the molecule, which are capable of being chemically combined with other groups to form a molecule in which the chiral group is sterically hindered with respect to the main molecular core.

Apart from the advantages which the chemical structure of many naturally occuring chiral compounds provides, ie in facilitating the steric hindrance discussed above, another advantages of natural compounds is their cheapness, in being available in bulk from animal or vegetable sources, eg waste products.

A further great advantage is their optical purity. Biosynthetic reactions are often extremely stereospecific, and often a naturally occuring chiral molecule is formed in animals or plants exclusively in the D (dextro) or L (laevo) form. Furthermore, naturally occuring chiral compounds often have convenient functional groups such as hydroxy, amino or carboxylate groups, which enable easy combination with other groups in straightforward stereospecific syntheses to build up the molecular core.

A very wide range of naturally occurring chiral compounds exist and may be used in the present invention. It is convenient to use those wich have suitable functional groups at appropriate sites in the molecule.

It is desirable to use naturally occurring chiral molecules which have bulky groups adjacent to the functional groups which are used for bonding to the main molecular core, so as to promote steric hindrance at the chiral centre relative to the main molecular core.

It is particularly preferred to use derivatives of the following series of naturally occurring compounds in the present invention:

(i) hydroxy carboxylic acids. These may be α- or β-, isomers provided that they contain a chiral centre.

α-hydroxy carboxylic acids are generally preferred, ie those containing the chiral unit:

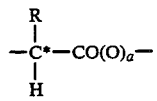

wherein a may be 0 or 1 R may be alkyl, alkoxy or

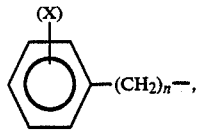

where n may be 0 to 3 and X indicates that one or more substituents such as alkyl, alkoxy, halogen substituted alkyl or alkoxy, alkyl carbonyloxy, alkoxy carbonyl, CN or halogen present. Of the hydroxy acids, lactic acid, ie $CH_3{}^*CH(OH)CO_2H$ (ie R in formula 9 is methyl) and mandelic acid

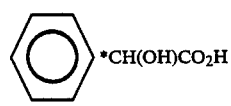

(ie R in formula 9 is phenyl) are preferred, especially the former, as lactic derivatives have been found to be an exceptionally useful series of compounds in two-constituent ferroelectric mixtures as hereinafter defined.

With derivatives of α-hydroxy carboxylic acids, the chiral centre is flanked by two directly adjacent functional groups, —OH and —$CO_2H$, so that the chiral centre may be linked directly to a molecular core of the type in formula (6) above by an ester linkage, to produce a compound such as (10):

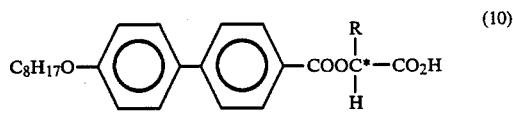

(from which derivatives such as esters may be produced). In the compound (10) the chiral centre is sterically hindered by its close proximity to the molecular core.

Examples of chiral β-hydroxy carboxylic acids are β-hydroxy-n-butyric acid (11) and β-hydroxy-isobutyric acid (12):

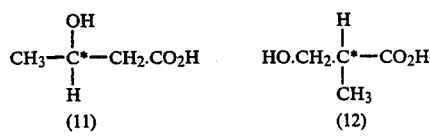

It will noted that if linking of the chiral centre to the molecular core occurs through the carboxylate unit in the case of (11), and through the hydroxyl unit in (12) then the chiral centre will be less liable to be sterically hindered relative to the main molecular core, as there is an intervening $CH_2$ group. The β-hydroxy carboxylic acids are thus less likely to be effective as first constituents in the mixtures of the invention in producing a high $P_s$.

Derivatives of γ-, δ- and other isomers of hydroxycarboxylic acids may also be used, but as these show a strong tendency to form cyclic lactones, they are less suitable.

The derivative of the hydroxy carboxylic acid may conviently be linked to the main molecular core either by an ester link via its OH group to a carboxylate group on the core, or by an ester (ie a=1) or amide (ie a=0) link to its carboxylate group from an OH or amine group on the core. These linking reactions may be performed using which can be derived from known literature routes, and are also described in detail in the Applicants co-pending patent application entitled "Alpha-Hydroxycarboxylic Acid Derivatives suitable for use in Liquid Crystal Materials and Devices" claiming priority from UKPA No. 8428653 (Applicant's Ref D/PD Pats (P0102).

(ii) Amino Acids. These may be chiral α-, β-, γ- or δ-amino acid derivatives, but the most convenient are the well known series of saturated α-amino acids which form a major part of animal protein and are thus available in bulk. The α-amino acids have the chiral centre:

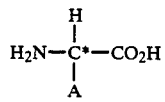
(13)

wherein A represents the residue of the α-amino acid. For example in α-alanine, with the structure CH$_3$—CH(NH$_2$)CO$_2$H A is methyl. The naturally occurring α-amino acids are listed in table 1 with the respective residues A being indicated.

The α-amino acid will normally be linked to the main molecular core by its amino functional group or its carboxylate group. The amino group may conveniently be linked by an amide type linkage, and the carboxylate group may be conveniently linked to the molecular core by an ester or amide type link, ie to produce a chiral unit in the molecule of the structure:

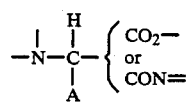
(14)

TABLE 1
NATURALLY OCCURING α-AMINO ACIDS

| NAME | FORMULA | RESIDUE A |
|---|---|---|
| GLYCINE | H$_2$N.CH$_2$.CO$_2$H | H |
| α-ALANINE | CH$_3$.CH(NH$_2$)CO$_2$H | CH$_3$ |
| SERINE | CH$_2$OHCH(NH$_2$)CO$_2$H | CH$_2$OH |
| VALINE | CH$_3$.CH.(CH$_3$)CH(NH$_2$)CO$_2$H | (CH$_3$)$_2$CH |
| THREONINE | CH$_3$.CH(OH)CH(NH$_2$)CO$_2$H | CH$_3$.CHOH |
| CYSTEINE | HSCH$_2$CH(NH$_2$)CO$_2$H | HSCH$_2$ |
| LEUCINE | CH$_3$CH(CH$_3$)CH$_2$CH(NH$_2$)CO$_2$H | (CH$_3$)$_2$CHCH$_2$ |
| ISOLEUCINE | CH$_3$.CH$_2$CH(CH$_3$)CH(NH$_2$)CO$_2$H | CH$_3$.CH$_2$.CH(CH$_3$) |
| METHIONINE | CH$_3$SCH$_2$CH$_2$CH(NH$_2$)CO$_2$H | CH$_3$SCHCH$_2$ |
| PHENYLALANINE | C$_6$H$_5$—CH$_2$CH(NH$_2$)CO$_2$H | C$_6$H$_5$—CH$_2$ |
| TYROSINE | HO—C$_6$H$_4$—CH$_2$CH(NH$_2$)CO$_2$H | HO—C$_6$H$_4$—CH$_2$ |
| TRYPTOPHAN | (indole)—CH$_2$CH(NH$_2$)CO$_2$H | (indole)—CH$_2$ |
| ASPARTIC ACID | HOOCCH$_2$CH(NH$_2$)CO$_2$H | HOOC.CH$_2$ |
| GLUTAMIC ACID | HOOC.CH$_2$CH$_2$CH(NH$_2$)CO$_2$H | HOOC.CH$_2$CH$_2$ |
| ASPARAGINE | H$_2$NCOCH$_2$CH(NH$_2$)CO$_2$H | H$_2$NCOCH$_2$ |
| GLUTAMINE | H$_2$NCO(CH$_2$)$_2$CH(NH$_2$)CO$_2$H | H$_2$NCO(CH$_2$)$_2$ |
| ORNITHINE | H$_2$N(CH$_2$)$_3$CH(NH$_2$)CO$_2$H | H$_2$N(CH$_2$)$_3$ |
| LYSINE | H$_2$N(CH$_2$)$_4$CH(NH$_2$)CO$_2$H | H$_2$N(CH$_2$)$_4$ |
| ARGININE | HN=C(NH$_2$)NHCH$_2$CH$_2$CH$_2$CH(NH$_2$)CO$_2$H | HN=C(NH$_2$)NHCH$_2$CH$_2$CH$_2$ |
| CYSTINE | SCH$_2$CH(NH$_2$)CO$_2$H<br>\|<br>SCH$_2$CH(NH$_2$)CO$_2$H | |

In molecules of this type there is a tendency for the N-H unit to polarise or to form a more ionic structure, and thus to become less soluble in liquid crystal materials. It is therefore desirable to replace the N-H unit by an N-B unit, where B is a group containing no hydrogens which are likely to form strong hydrogen bonds, for example alkyl, preferably n-alkyl with 1-20 carbon atoms, especially methyl, or acyl, ie-COR where R is alkyl, preferably n-alkyl having 1 to 20 carbon atoms, especially ethyl.

Some of the residues A of the naturally occurring α-amino acids also contain functional groups, for example aspartic acid (15) which contains a carboxylic acid group in its residue, and ornithine (16) which contains an amino group in its residue; and serine (17) which contains an hydroxy group in its residue:

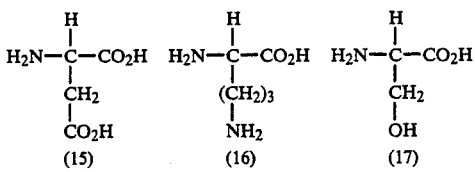

(15)    (16)    (17)

Others will be apparent from Table 1.

These functional groups in the residue may also lead to undesirable polarity, and in the structure of (14) it is desirable to convert the $NH_2$ units of the amino groups in the residue also into NBB' units and to convert the carboxylate groups in the residue into ester or amide groups, ie COOB groups or CONBB' groups where B' may be selected from the groups from which B is selected, and to convert OH groups in the residue into OB units especially where B is acyl.

It will be appreciated that as well as linking the α-amino acid group into the molecule in the manner shown in (14) it is also possible to link the α-amino acid group into the molecule using the NH, $CO_2H$ and OH functional positions in the residue A when these are present, via ester linkages in the case of $CO_2H$ and OH functions, and amide linkages in the case of $CO_2H$ and NH functions. Linkages to these positions in the residue may be in addition to or as an alternative to the use of the NH and $CO_2H$ groups in the α-position, and makes possible structures in which chiral units of the types:

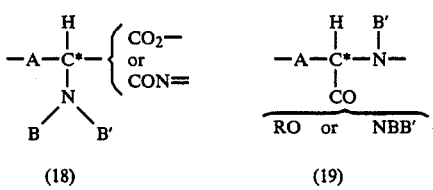

(18)    (19)

Where B and B' may be the same and R is an alkyl, preferably n-alkyl having 1-20 carbon atoms, especially ethyl, are linked to the main molecular core at either the positions indicated.

In the structural types (14), (18) and (19) above it will be appreciated that the chiral centre in the amino acid unit will be sterically hindered relative to the main core of the molecule, and also that in the case when the main core of the molecule contains an aromatic group bonded to the nitrogen through an amide link, ie —CON— then there is the additional possibility of a ring-π-amide interation causing locking of preferred conformations of the amide to the ring.

Suitable chemical synthetic routes to compounds of this type may be derived from the literature using essentially standard esterification and amide forming reactions. It will be appreciated that the presence of two or more identical functional groups in the molecule necessities careful protecting and de-protecting steps. Methods of achieving this are described in the Applicant's copending patent applications UKPA's 8520714 and 8524879.

(iii) Terpenoids. These are a series of naturally occurring compounds derived from isoprene, and may be monoterpenoids (2 isoprere units), sesquiterperoids (3 isoprene units), diterperoids (four isoprene units), and triterperoids (six isoprene units) Terpenoids may be monocyclic, bicyclic or tricyclic. Not all terpenoids are chiral, and of those that are, monoterpenoids, bicyclic monoterpenoids and tricyclic sesquiterpenoids are preferred.

Examples of chiral monocyclic monoterpenoids are menthol (20) neomenthyl, isomenthol, neoisomenthol, carveol, dihdrocarveol, terpin-4-ol,α-terpineol and limonen-10-ol.

Examples of chiral bicyclic monoterpenoids include borneol (21) and isoborneol.

Examples of chiral tricyclic sesquiterpenoids include longifolol (22) and cedrol.

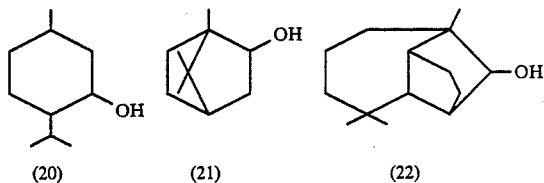

(20)    (21)    (22)

The predominent functional group in the terpenoid structure is the hydroxyl, and thus it is relatively straightforward to form an ester link to the main molecular core.

It is preferred to use a terpenoid containing a hydroxyl functional group in which the structure also has a bulky side group in an adjacent position (s) to promote steric hindrance of the chiral unit relative to the main molecular core. For example the bulky iso-propyl side chain in menthol at the adjacent ring position to the hydroxyl hinders rotation about a link to the hydroxyl.

In the case of terpenoids however, there have been found to be two conflicting effects: the presence of a large side group promotes a high Ps when terpenoid derivatives are used as first constituents in the mixture of the invention, but a small side group promotes the appearance of smectic phases. Consequently derivatives of menthol have been found to promote a high Ps, but give no smectic phase. Isopinocampheol derivatives (23)

(23)

appear to be best on balance.

Methods of preparing derivatives of chiral terpenoids by esterification prossess will be apparent to those skilled in the art, and are described in detail in Applicants' copending patent application UKPA 8501999.

(iv) Steroids. These are a large class of organic compounds based upon the perhydro-1,2-cyclo pentenophenanthrene ring system (24):

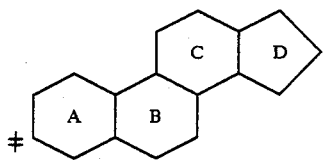
(24)

Although derivatives of cholesterol posess nematic liquid crystalline phases and have given their name to the chiral nematic "cholesteric" mesophase, their use in smectic liquid crystals is novel. The naturally occurring sterols are almost all hydroxy—substituted in the 3 position, ie the position ǂ in ring A. Sterols with substitution at other positions are rare, and their isolation for use in bulk may be expensive, thus reducing their advantage.

(v) Other naturally occurring chiral molecules. A vast number of naturally occurring chiral molecules possess the desirable features which have been identified in the classes of molecules discussed above, eg functional groups which can undergo sterospecific reactions, bulky side groups adjacent to the functional group to promote steric hindrance yet not so large as to suppress smectic phase formation, cheapness, non polarity, materials. Possible candidates for the preparation of derivatives which possess at least some of these features, but may suffer from disadvantages unless appropriate substitution is made include:

Sugars-cheap, optically pure, functional—OH groups, yet possibly too hydrophilic and too polar. polycarboxylic acids, glyceraldehyde derivatives. The molecular core to which the chiral units discussed above is linked to form a compound suitable for use as a first constituent of a two constituent ferroelectric mixture as defined herein will generally consist of a chain of cyclic groups, which may be linked either directly or indirectly by bridging groups, and often having an alkyl or alkoxy terminal substituent, as well known in the liquid crystal field and as exemplified in structures (1) to (7).

When the chiral unit has two linking positions, as in the case of the α-hydroxy carboxylic acid group (9), or the amino acid units (14), (18) and (19) then the derivative should have the structure

X—(C*)—Y wherein C* is the chiral unit wherein X represents a group having a structure:

$R_1-S^9-(A^1S^1)_i-(A^2S^2)_j-(A^3S^3)_k-(A^8S^8)_r-$ wherein Y represents a group having a structure:

$-(S^7A^7)_p-(S^6A^6)_n-(S^5A^5)_m-(S^4A^4)_l-S^{10}-R_2$ wherein each of $R_1$ and $R_2$ is independently selected from hydrogen, alkyl, alkoxy, fluoroalkyl, fluoroalkoxy, alkoxy substituted alkyl, alkanoyl, alkanoyloxy, alkyl carbonyloxy, alkoxy carbonyl, halogen wherein each of $S^1$, $S^2$, $S^3$, $S^4$, $S^5$, $S^6$, $S^9$ and $S^{10}$ independently represents a single covalent bond or a group selected from $CO(O)_a$, $(O)_aOC$, $CH_2$, $CH_2CH_2$, $CH_2O$, $OCH_2$, $-CH=N-$, $N=CH$, CHD, $CH_2CHD$ and $CHD-CH_2$ where D represents a substituent CN, $CF_3$, $CH_3$ or halogen wherein each of $S^7$ and $S^8$ independently represents a single covalent bond or any of the groups from which $S^1$, $S^2$, $S^4$, $S^5$, $S^6$, $S^9$ $S^3$ or $S^{10}$ are selected and $S^7$ may also represent $(CH_2)_q$ where q is 1 to 12

Wherein each of $A^1$ to $A^8$ is selected from the following cyclic groups, each of which may carry one or more substituents: phenyl, cyclohexyl, bicyclo(2,2,2)octyl, pinane, naphthyl, pyridyl, pyrimidyl, piperidyl, or cyclohexyl having one or two $-CH_2-$ units replaced by oxygen or sulphur;

wherein each of a, i, j, k, l, m, n, p and r independently represent 0 or 1.

When any of $S^1$ to $S^{10}$ links a cyclic group $A^1$, $A^2$, $A^3$, $A^4$, $A^5$, $A^6$ to the chiral unit ($C^l$), then the link between the cyclic group and the chiral unit is preferably an amide or an ester link.

When the chiral unit has only one linking position, as is the case of termpenoids then the derivative should have the structure

X—T where X is as designated above, and $S^7$ is preferably an ester link.

When the derivative is of a terpenoid, then the group X will be the molecular core. Where the derivative is of an hydroxycarboxylic acid or an amino acid, then either X or Y may be the molecular core. In situations where X and Y are of approximately the same size and/or both contribute to the liquid crystal properties of the mixture then it may be more convenient to consider the combination of X and Y as the molecular core, and in this case the chiral unit may be sterically hindered with respect to both or either of X and/or Y.

Preferred structures for X are

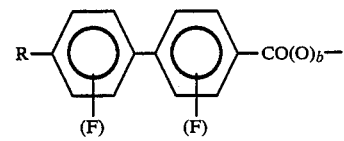

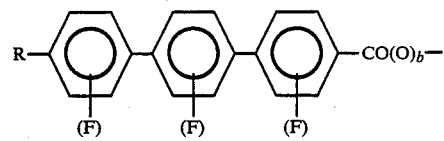

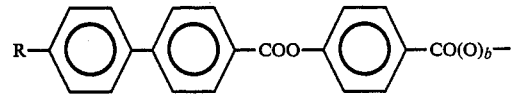

where b is 0 if an amide link is to be formed with the chiral unit, and 1 if an ester link is to be formed, the phenyl rings may be substituted, and R is preferably an n-alkyl, or n-alkoxy, especially containing 5-12 carbon atoms.

Preferred structures for Y are

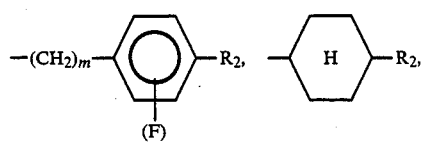

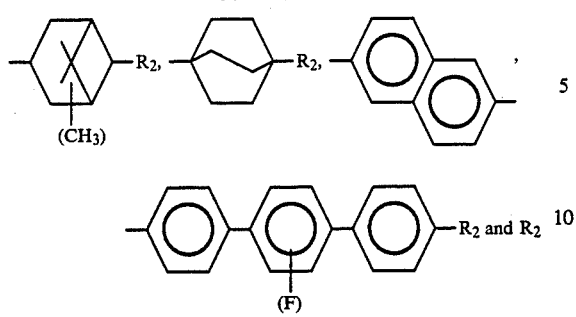

where (F) and (CH₃) indicates that one or more of the indicated substituents may be present, and m may be 0, 1 or 2.

An especially preferred combination of x and Y in the case of derivatives of amino acids is that in which R is n-octyloxy or n-alkyl, and $R_2$ is ethyl.

A range of other preferred X and Y combinations for lactic acid and amino acid derivatives is discussed in the Applicants copending patent application Ref D/PD Pats/P0102, and 8520714 and 8524879 respectively.

The use of a first constituent which has a molecular structure in which the chiral group of the molecule is sterically hindered with respect to the main molecular core, and the use of first constituents having this property which are derivatives of naturally occurring chiral molecules, in two constituent ferroelectric mixtures as hereinbefore defined is expected to be applicable to smectic second constituents generally. The advantage provided by the invention is to a large extent independent of the nature of the second constituent.

Although it is to be clearly understood that it is not necessary for the first constituent to exhibit an tilted smectic phase, it is likely to be beneficial if it does in fact exhibit such a phase. Also the main core of the first constituent should be compatable with the smectic phase molecular lattice so that it is prevented from tumbling, or excessive motion, in relation to the host. It should also be appreciated that high solubility is also a desirable characteristic for the first constituent insofar as it affords the possibility of a greater proportion of this constituent in the mixture and hence, in general, a greater value for the spontaneous polarisation. In general the second constituent, the material exhibiting a tilted smectic phase, will not normally be a single chemcial compound, but will be a eutectic mixture of several compounds. Likewise, though the first constituent may be a single chemical compound, there is likely to be advantage in many circumstances in employing a mixture of different compounds, which may also be a mixture of the same class of naturally occuring compounds, eg two lactates, or different classes, eg a lactate and a terpenoid.

Many suitable smectic second constituents (or "hosts") are known, such as for example the commercially available material racemic CE8 referred to above. This has the structue:

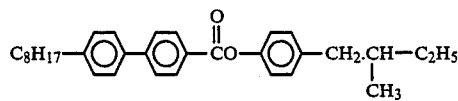

Other examples of suitable smectic hosts include: (a) The compounds and compositions disclosed in European patent application No. 0110299A2. (b) The compounds and compositions disclosed in Mol Cryst Liq Cryst 37, 157 (1976), eg esters having a central core of the structure:

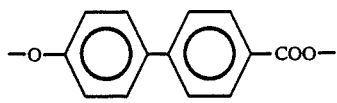

(c) The known compounds of formula:

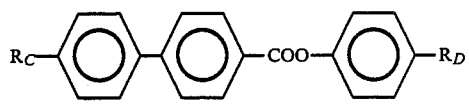

(or mixtures of them, which may be a racemic mixture) where $R_C$ and $R_D$ independently represent n-alkyl or n-alkoxy at least one of which is a chiral group. For example where $R_C$=n—$C_8H_{17}$ and $R_D$=(+)−2 methylbutyl the compound is commercially available from BDH Chemical Ltd, Broom Road, Poole, Dorset, UK.

(d) The compounds and compositions disclosed in UK patent application No. 8501509, for example those of formulae Ia to In on P2 of that application such as:

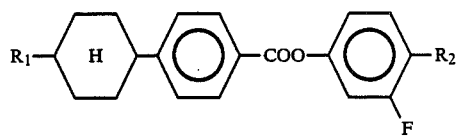

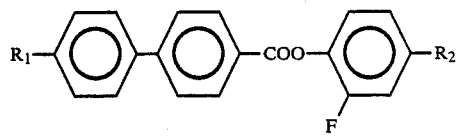

(e) The known compounds, or mixtures thereof, having a formula

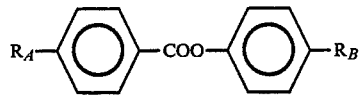

where one of $R_A$ and $R_B$ represents $C_{5-12}$n-alkoxy and the other represents $C_{7-12}$n-alkyl or n-alkoxy. These compounds are non chiral.

(f) The known compound PG 495

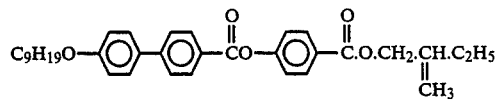

(g) The known compounds

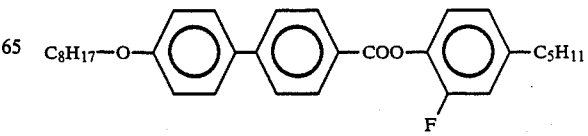

-continued

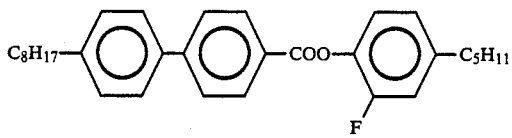

or mixtures of them

Both (f) and (g) above are available for BDH Chemicals Ltd.

Other suitable smectic host materials which may be mixed with compounds of Formula I will be apparent to those skilled in the art.

A mixture which contains one or more compounds of the invention, and exhibits a chiral smectic phase may have added to it one or more additives to engineer other preferred properites for a particular device such as viscosity, dielectric anistropy, birefringerence, pitch, elastic constants, melting point, clearing point etc. Additives showing a weak longitudinal dipole moment (eg compounds containing alkyl and/or alkoxy terminal groups) are preferred. Preferably they show a lateral dipole moment (eg by containing a lateral halogen, $CF_3$ or CN substituent).

In the field of smectic liquid crystal chemistry relatively little is known about the structural requirements for miscibility, and it is therefore somewhat difficult to predict which compounds will form stable mixtures with smectic phases. It may thus be necessary to carry out some relatively straightforward experiments to determine whether a particular combination of compounds such as a host, or additives as discussed above will form a stable mixture. Such experiments may in many cases comprise no more than melting a combination of compounds together (if they are not liquid at room temperature) and observing the appearance or otherwise of smectic phases by known methods such as optical microscopy.

Most research to date in this relatively new field has been concentrated on finding good working combinations of host and dopant, and it is expected that future work will be directed towards retiring and improving those combinations with additives.

There are some signs that compounds which have the same or a closely related molecular core or combination of cyclic groups and linking groups in their structure will be misable, for example the compound PG 495 is miscible with its analogue having the 2-methylbutyl ester group replaced by a lactate-ethyl ester. That this principle is not absolutely rigid is demonstrated by the wide range of compounds which are miscible with PG 495 and RCE 8 in tables 7 to 12.

Some possible examples of additives are given in Tables 4, 5 and 6 below, but it must be understood that this is only a general guide and experiments should be carried out in all cases to investigate suitability.

Examples of the families of compounds which may be added to a mixture containing a compound of the invention together with one or more of the tilted smectic compounds or materials such as (a) to (e) described above to produce a room temperature smectic C phase are shown in Table 4.

TABLE 4

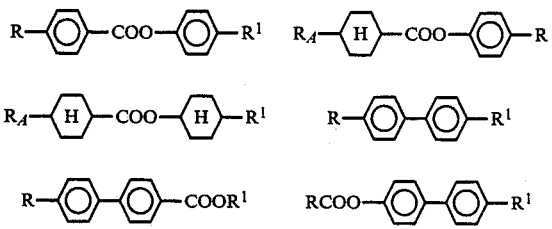

where R and R' are alkyl or alkoxy and $R_A$ is alkyl. Preferably R is $C_{5-12}$ n-alkyl or n-alkoxy or $C_{5-12}$ branched alkyl or alkoxy containing an asymmetrically substituted carbon atom eg 2-methylbutyl.

Examples of low melting and/or low viscosity additives are the compounds shown in Table 5.

TABLE 5

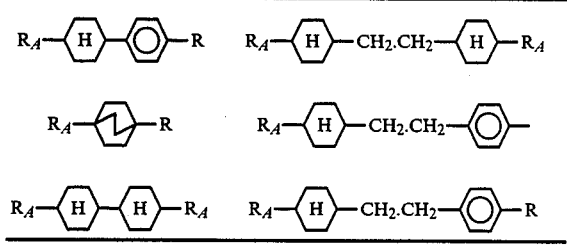

where each R is independently alkyl or alkoxy, eg $C_{1-18}$ n-alky or n-alkoxy, and each $R_A$ is independently alkyl, eg $C_{1-18}$ n-alkyl.

Examples of high clearing point additives are the compounds shown in Table 6.

TABLE 6

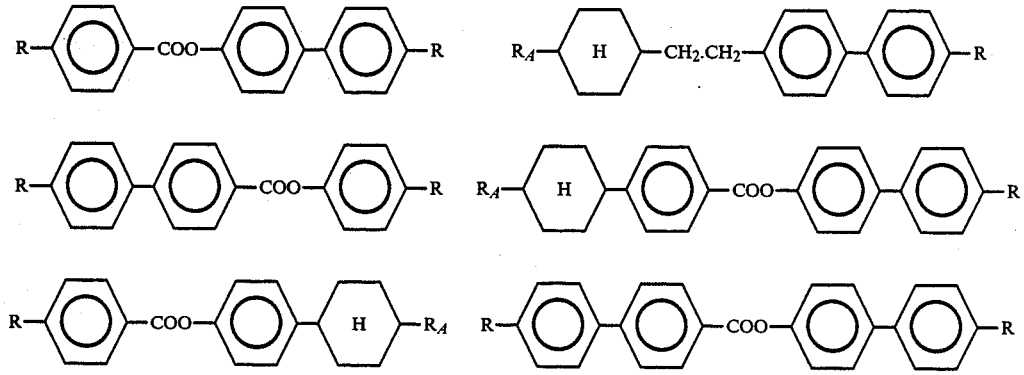

TABLE 6-continued

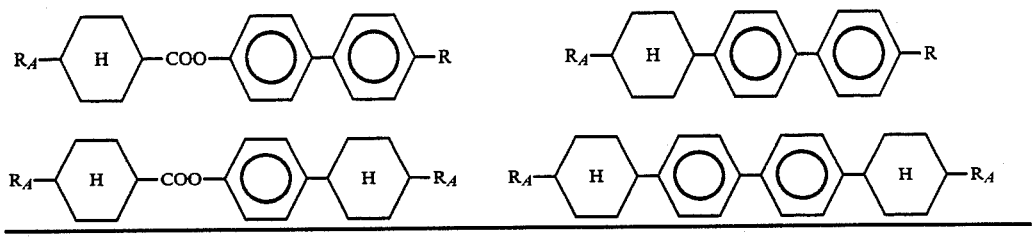

where R is alkyl or alkoxy, eg $C_{1-12}$ alkyl or alkoxy and $R_A$ is alkyl, eg $C_{1-12}$ or a fluorinated analogue of one of these compounds.

An example of a mixture according to this aspect of the invention is the following:

| | |
|---|---|
| (i) A component comprising one or more of the compounds (a) to (g) described above. | 25–75 mol % |
| (ii) A component comprising one or more of the compounds in Table 4 above. | 0–30 mol % |
| (iii) A component comprising one or more of the compounds in Table 5 above. | 0–30 mol % |
| (iv) A component comprising one or more of the compounds in Table 6 above. | 0–30 mol % |

The amount of each compound made up to 100% with one or more compounds of the invention contained in the mixtures of the invention depends on the properties required of the mixture, including the Ps value and the pitch of the molecular configuration in the chiral smectic phase. When the compound of the invention induces an increased Ps in the host, the Ps value induced generally increases with the amount of the compound of which is present in the host.

Alternatively or additionally some compounds of the invention may be capable of acting as hosts, in which case they may be optically active or racemic, to which a suitable dopant may be added (which may be a different compound of Formula I), and other additives such as those exemplified in Tables 4, 5 and 6 may be added to the mixture.

Where a mixture is formed by mixing a first component comprising one or more compounds of the invention with a second component which may itself comprise one or more of the invention and which is also chiral the respective molecular twist senses of or induced by the two components may be the same or opposed. Where the two senses are opposed the resultant mixture shows a longer helical pitch than those of the two components (if separately chiral smectic). The sense of the twist is the same as the component of shorter pitch, ie the more powerful twist, for a mixture of equal amounts of two chiral smectic components. By means of this principle the pitch of a mixture may be tuned as appropriate for its intended application. It is possible by this method to produce a mixture in which the respective twist sense of the components cancel each other out, to produce a mixture of effectively infinite pitch.

In a mixture it is also possible for the respective senses of polarisation, ie (+) or (−) to be the same or opposed and hence additive or subtractive.

Hence it is possible to prepare a mixture in which the twist senses of the of the components are opposed and cancel each other out, whilst the polarisations are additive.

Liquid crystal mixtures which show a tilted S* ferroelectric liquid crystal phase, and which incorporate one or more compounds of the invention, either as dopant or host or both and optionally including one or more of the other compounds or types of compounds discussed above, constitute another aspect of the invention.

Liquid crystal ferroelectric materials incorporating a compound of the invention may be used in known liquid crystal electro-optical devices, eg processing, storage and display devices, which utilise the properties of S* mesophase.

An example of such a device is the "Clark Lagerwall Device", described in Reference 1, and also in "Recent Developments in Condensed Matter Physics" 4, p309, (1981) (Reference 3). The physics of this device, and methods of constructing one are well known. In practice such a device usually consists of two substrates, at least one of which is optically transparent, electrodes on the inner surfaces of the substrates and a layer of the liquid crystal material sandwiched between the substrates.

Such a device, when incorporating a compound of Formula I, also constitutes an aspect of the invention.

The Clark Lagerwall device uses a layer of liquid crystal material between the substrates of a thickness comparable to or less than the helical pitch of the S* configuration, which causes the helix to be unwound by surface interactions. In its unwound state the material has two surface stabilised states with director orientations (ie molecular tilt direction) at twice the tilt angle to one another, and also permanent dipole orientations perpendicular to the substrates but in opposite directions.

An alternative approach to providing cells for a Clark-Lagerwall device having a thicker layer of liquid crystal material is to use an applied electric field to induce homogenous alignment through interaction with the dielectric anistropy of the liquid crystal material. This effect requires a chiral smectic material having a negative dielectric anisotropy, eg provided by incorporation of a compound having a lateral halogen or cyano substituent. Such a compound may itself be chiral or non-chiral and smectic or non-smectic.

In general chiral smectic C materials ($S_C^*$) are used in these displays because these are the most fluid, but in principle the more ordered chiral smectics could also be used. A pleochroic dye may also be incorporated in the liquid crystal material to enhance the electro-optic effect.

Such a device incorporating compounds of Formula I offers the possibility of a high switching speed of a few microseconds—as demonstrated in Reference 3—together with bistable storage capability; and so is likely to have important applications in displays, optical processing devices, and optical storage devices. In particular this facilitates the construction of the electro-optical device in the form of a large screen, eg 30 cm by 20 cm, suitable for use in visual display units, portable computers etc.

Examples of the preparation and properties of compounds embodying the present invention will now be described. In the following examples certain abbreviations and symbols used having the following meanings:

| h | = hours; |
|---|---|
| g | = grammes; |
| mp | = melting point; |
| bp | = boiling point; |
| hplc | = high pressure liquid chromatography; |
| $C-S_{A,B,C}...$ | = crystalline solid to smectic A, B, C ... liquid crystal transition temperature °C. |
| $[\alpha]_D^{24}$ | = optical rotation angle at 24° C. using sodium-D line |

Hosts: RCE8 is racemic

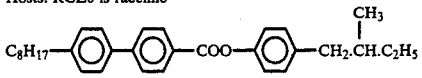

RPG495 is racemic

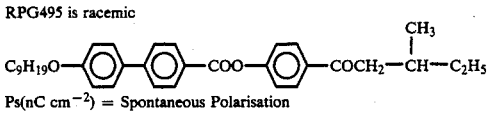

Ps(nC cm$^{-2}$) = Spontaneous Polarisation

Ps extrapolated to 100 mol % concentration from mixtures containing approx 10 mol % concentration.

All data on Ps is given at a temperature of 10° C. below the $S_A$-$S_C$* transition unless otherwise stated.

EXAMPLE 1

The preparation of compounds of generalised Formula:

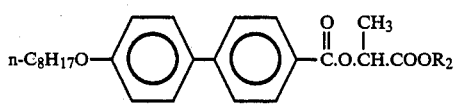

using route b.

Step 1a: Preparation of (S)-propyl lactate

To a stirred suspension of Amberlite IR-120(H) (20.0 g) in sodium-dried benzene (300 cm$^3$) was added (S)-(+)-lactic acid (53.0 g, 0.59 mol) and propanol (75.0 g, 1.25 mol). The stirred reaction mixture was then heated, under reflux conditions, for 5 h, with the water being collected in a Dean and Stark apparatus. When cooled, the resin was filtered off and washed with two portions (25 cm$^3$) of benzene. The benzene filtrate was then shaken with potassium carbonate (5.0 g), filtered and washed with a little benzene.

Distillation under reduced pressure (water pump) afforded the (S)-propyl lactate as a colourless liquid, 31.5 g (44%), bp 69°–73° C. (water-pump) From the nmr spectrum, the (S)-propyl lactate was still contaminated with propanol. This was removed by azeotropic distillation with toluene.

The product was then again distilled, under reduced pressure (water-pump) to afford the (S)-propyl lactate as a colourless liquid, 23.0 g (32%), bp 69°–71° C. (water pump). The product was free from propanol.

Step 1b: Preparation of (S)-Propyl 2-(4'-octyloxy biphenyl-4-carbonyloxy) propanoate 4'-n-Octyloxybiphenyl-4-carboxylic acid (5.9 g, 0.0153 mol) was gently heated, under reflux conditions, with an excess of freshly distilled thionyl chloride (30 cm$^3$) for 3 h. The unreacted thionyl chloride was removed by distillation under reduced pressure and the crude acid chloride was then dissolved in dry dichloromethane (10 cm$^3$). The solution of the acid chloride was then added, dropwise, to a stirred solution of the (S)-propyl lactate (2.25 g—prepared as in Step 1a) and dry triethylamine (2 cm$^3$) in dry dichloromethane (10 cm$^3$). The reaction mixture was then stirred at room temperature for 16 h.

The cold reaction mixture was diluted with dry dichloromethane (20 cm$^3$) and washed with dilute hydrochloric acid, water and then finally dried over magnesium sulphate.

The crude ester was purified by column chromatography on silica gel, using chloroform as the eluent. Several recrystallisations from ethanol afforded the (S)-propyl 2-(4'-octyloxybiphenyl-4-carbonyloxy) propanoate as a crystalline solid, 2.5 g (37%), mp 58° C.

The purity of the product was checked by hplc (reverse phase; various water/methanol mixtures). The chemical structure of the product was confirmed by a combination of the following techniques:

1. $^1$Hnmr spectroscopy (using a Jeol J NM-PM×60 model spectrometer);
2. Infra-red spectroscopy (using a Perkin-Elmer 457 model grating spectrophotometer);
3. Mass spectrometry (using an AEI MS 902 model mass spectrometer).

The optical purity of the product was checked by nmr spectroscopy using chemcial shift reagents.

EXAMPLE 2

(S)-Ethyl 2-(4'-octyloxybiphenyl-4-carbonyloxy) propanoate was prepared by an analogous procedure to that of Example 1. The product, whose composition and purity were checked as in Example 1, showed C-$S_A$=39° C. and $S_A$-I=42.0° C.

The (S)-ethyl lactate used in Example 2 was obtained commercially from Aldrich Chemical Co Ltd, Gillingham, Dorset, UK.

EXAMPLE 3

(S)-methyl 2-(4'-octyloxybiphenyl-4-carbonyloxy) propanoate was prepared by an analogous procedure to that of Example 1. The composition and purity of the product were checked as in Example 1. The product showed C-I=57° C. and $S_A$-I=(49.2° C.) (monotropic).

The (S)-methyl lactate used in Example 3 was obtained commercially from Aldrich Chemical Co Ltd, Gillingham, Dorset, UK.

EXAMPLE 4

(S)-n-Butyl 2-(4'-octyloxybiphenyl-4-carbonyloxy) propanoate was prepared by an analogous procedure to Example 1. The product, whose composition and purity were checked as in Example 1, showed a melting point of 51° C.

The (S)-n-Butyl lactate used in Example 4 was prepared in a manner analogous to Step 1a above. This compound was found to have a bp of 86°–89° C. (water pump).

EXAMPLE 5

The preparation of:

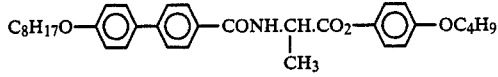

4-n-Octyloxybiphenylyl 4' carboxylic acid (10 mmol) was stirred for 2-3 hr in dry benzene with oxalyl chloride (29 mmol) and dimethyl formamide (catalytic amount). The solvent and unreacted oxalyl chloride were then removed by vacuum evaporation.

The resulting 4-n-octyloxybiphenylyl 4' carbonyl chloride was dissolved in dry dichloromethane (30 ml) and the solution was added dropwise during 20 minutes to a very vigorously stirred solution of l-alanine (10 mmol) in saturated aqueous sodium hydrogen carbonate (100 ml). Stirring was continued for a further 30 minutes, then the solution was acidified and organic material was extracted into dichloromethane (3×50 ml). The combined extracts were dried and evaporated to give the crude amide which was purified by flash chromatography on silica gel with 3:1 ethyl acetate: petroleum fraction (bp 60°-80° C.) as eluant.

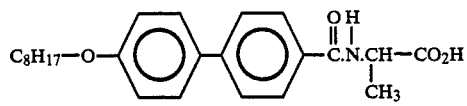

was obtained in 60-70%, mp 215° C.

A mixture of N-(4'-n-octyloxybiphenyl-4-oyl)-L-alanine (10 mmol), NN'-dicyclohexylcarbodiimide (11 mmol), 4-n-butoxyphenol (11 mmol), 4-pyrrolidinopyridine (1 mmol) and dichloromethane (50 ml) was stirred at room temperature until the reaction was complete (tlc). The precipitated NN' dicyclohexylurea was filtered off and the filtrate was washed successively with water (3×50 ml), aqueous 5% acetic acid (3×50 ml) and again with water (3×50 ml). The organic layer was dried and evaporated to give the crude ester, which was purified by column chromatography on silica gel with 3:1 ethyl acetate: petroleum fraction (bp 60°-80° C.) as eluant. Ref. A Hassner and V Aleanian. *Tetrahedron Letters* 1978, 4475.

The yield for compound:

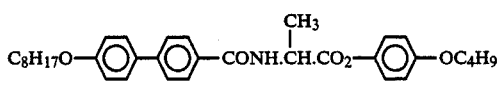

was 86%; mp 184°-185° C.

By an analogous route the two compounds:

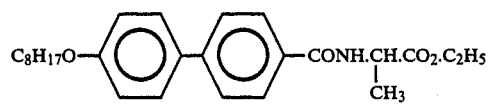

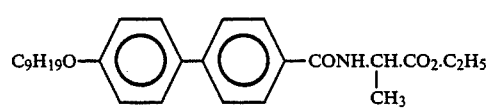

are prepared. The Ps value of these was measured by extrapolation from the value in a 10% solution of each in racemic:

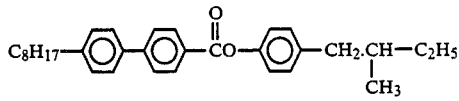

The Ps values by extrapulation were 141 and 138 respectively.

EXAMPLE 6

Preparation of (−) menthyl 4-n-decyloxybiphenyl-4'-carboxylate.

4-n-Decyloxybiphenyl-4'-carboxylic acid (2 g; 0.0056 m), which had been prepared by hydrolysis of 4-cyano-4'-n-decyloxybiphenyl (supplied by BDH, Poole, Dorset), was heated under reflux for 3 hours with thionyl chloride (30 ml). The thionyl chloride was then removed on a rotary evaporator; residual thionyl chloride was next evaporated off by azeotropic distillation using dry benzene.

The acid chloride was dissolved in dry pyridine (30 ml) and cooled in an ice bath. (−)Menthol (0.94 g; 0.006 m) $[[\alpha]_D^{16} = -44°]$ was dissolved in the minimum volume of dry pyridine and added to the acid chloride solution over a period of 15 minutes. The reagents were stirred for 1 hour in the ice bath, then overnight at room temperature, and finally for 2 hours at 60° C. After cooling, the mixture was poured into dilute hydrochloric (100 ml), and the product extracted with dichloromethane (100 ml). The dichloromethane layer was washed with dilute hydrochloric acid solution (100 ml) a further five times, and then with water (100 ml) and finally with a dilute solution of sodim bicarbonate (100 ml). After drying the dichloromethane solution with magnesium sulphate, it was rotary evaporated to leave a low melting point solid. This was purified by column chromatography on silica gel (70-130 mesh) using 1 part dichloromethane to 2 parts petroleum ether (b.p. 40°-60° C.) as eluent. The isolated solid was crystallised from I.M.S. to constant melting point and single spot purity by thin layer chromoatography. The melting point of the final product was 26° C., and evidence that it was indeed an ester was provided by the presence of an infra-red absorption peak at 1710 cm$^{-1}$ corresponding to the C=O stretching vibration frequency.

EXAMPLE 7

The above preparation method was repeated using 4-n-octyloxybiphenyl-4'-carboxylic acid and (−) menthol. The melting point of the product was 57°-58° C. From measurements upon a solution of 3-14 weight % of this product in racemic CE8 extrapolated values of $P_s$ for this material of 52 and 71.6 nCm$^{-2}$ were calculated respectively for temperatures of 5° and 10° C. below the $S_A$-$S_C^*$ transition. (This compares with the corresponding extrapolated $P_s$ values of 53 and 78 nCcm$^{-2}$ previously quoted for the decyloxy homologue of Example 1.)

Referring now to the accompanying drawing a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and each of these electrode layers is covered within the display area defined by the perimeter seal with a polymer layer, such as polyimide (16,17), provided for molecular alignment purposes. Both polyimide layers are rubbed in a single direction so that when a liquid crystal is brought into contact with them they will tend to promote planar alignment of the liquid crystal molecules in the direction of the rubbing. The cell is assembled with the rubbing directions aligned parallel with each other. The thickness of the liquid crystal layer contained within the resulting envelope is determined by the thickness of the perimeter seal, and control over the precision of this may be provided by a light scattering of short lengths of glass fibre (not shown) of uniform diameter distributed through the material of the perimeter seal. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed). The filling operation is carried out with the filling material heated into its isotropic phase as as to reduce its viscosity to a suitably low value. It will be noted that the basic construction of the cell is similar to that of for instance a conventional twisted nematic, except of course for the parallel alignment of the rubbing directions.

Typically the thickness of the perimeter seal 13, and hence of the liquid crystal layer, (18), is about 10 microns, but thinner or thicker layer thicknesses may be required to suit particular applications depending for instance upon whether or not bistability of operation is required and upon whether the layer is to be operated in the $S_C^*$ phase or in one of the more ordered phases such as $S_I^*$ or $S_F^*$.

The liquid crystal filling is a two-constituent ferroelectric mixture as hereinbefore defined. The first constituent may for instance, be one of the materials specifically described with reference to the examples or a mixture of both such materials. In the foregoing description specific two-constituent mixtures have employed racemic CE8 as the second (host) constituent. While CE8 is a suitable material for illustrating the properties of first constituent materials, it is not particularly well suited to actual display applications because of the relatively narrow temperature range of its tilted smectic phases, and moreover because this range is significantly above room temperature. Accordingly for the second constituent of a non-experimental device it is generally preferred not to employ CE8 as the sole component of the second constituent but to employ a mixture such as:

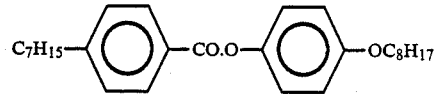

Such cells may be used for instance in display applications, optical switching applications, and optical information processing applications.

In use, the cell is normally mounted between polarisers (19) one with its axis parallel to the direction of rubbing and the other with its axis perpendicular to the axis of rubbing, so that the cell, as viewed with back illumination will have a transparent, ie bright, state and an opaque, ie dark, state.

The invention is exemplified below by means of comparisons in Table 2 of the Ps in $nCcm^{-2}$ values of a number of compounds. The lactate, amino acid and terpenoid derivatives were prepared using methods described in the Applicant's copending patent applications referred to herein.

Ps values quoted are extrapolated Ps, ie the Ps value in the smectic C phase of a host (racemic CE8) was measured using known methods at a known concentration, normally 10 mole % solution at a temperature 10% below the $S^*_C$-$S_A$ transition (unless otherwise stated) and the value extrpolated to 100% of the compound.

TABLE 2

| Ref | Compound | Ps |
|---|---|---|
| A | 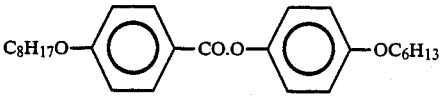 | 0.14 |
| B | 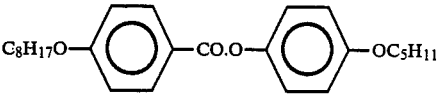 | 2.0 |
| C | 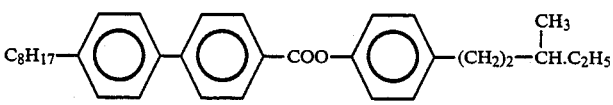 | 3-4 |

TABLE 2-continued

| Ref | Compound | Ps |
|---|---|---|
| D | C8H17O—⟨◯⟩—⟨◯⟩—COO—CH2.CH(Cl)—CH3 | 20 |
| E | C8H17O—⟨◯⟩—⟨◯⟩—COO—CH(CH3)—COOC2H5 | 72.6 |
| F | C8H17O—⟨◯⟩—⟨◯⟩—CONH—CH(CH3)—COOC2H5 | 141 |
| G | C8H17O—⟨◯⟩—⟨◯⟩—COO—⟨◯⟩—CONHCH(CH3).COOC2H5 | 138 |
| H | C8H17O—⟨◯⟩—⟨◯⟩—COO-(menthyl) | 71.6 |
| I | C8H17O—⟨◯⟩—⟨◯⟩—COO-(bornyl) | 28 |
| J | C10H21O—⟨◯⟩—CH=N—⟨◯⟩—CH=CH—COO.CH2—CH(CH3).C2H5 | 3-4 |
| K | C8H17O—⟨◯⟩—CH=N—⟨◯⟩—COO-(menthyl) | 68 |

Comparing A and B, both possess the same moleular core and the same chiral unit, 2 methyl butyl. However in A the chiral unit has been moved further away from the molecular core and is thus more free to rotate relative to the core. The Ps value of A is more than an order of magnitude less than that of B, which is attributed to the increased freedom to rotate.

When the 2-methyl butyl group is even more restricted from rotation by attacking it in close proximity to the carbonyl group of an ester, as in C, an even higher Ps of 3-4 is obtained. That the nature of the molecular core has relatively little effect is demonstrated by comparison with J, in which a very different core is present, but the same order of Ps is obtained.

Comparing C, D and E, with the same molecular core there is a progression of steric hindrance from the relatively unhindered 2-methyl butyl of C, through 2-chloropropyl, having a bulky and polar chloro-substituent, to a lactate group, substantially sterically hindered against rotation relative to the molecular core. There is a corresponding increase in Ps.

F and G have bulky chiral centres derived from the amino acid α-alanine. Their Ps values are very high compared with compounds having the same or virtually the same molecular core. F is analogous to the lactate E, with the Oxygen of the lactate-core ester link replaced by an N-H. Possibly this is due to some $\pi$ interaction between the carbonyl and the N lone pair but other causes cannot be ruled out.

H and I have chiral units derived from (—) menthol and d(—) borneol respectively. Rotation of the chiral methyl unit in H is hindered by the bulky isopropyl group projecting from the ring, and in I the smaller projecting methyl hinders rotation of the chiral ring system. Ps values substantially higher than the unhindered analogues C and D are found.

J and K have similar molecular cores, but in J the chiral Z-methylbutyl group is at a distance from the core and is free to rotate. In K a bulky (−) menthyl group has been used, attached by an ester link to the molecular core, with a very substantial increase in Ps.

These results indicate clearly the advantage of the use of sterically hindered chiral centres generally, and in particular the advantages of the use of derivatives of naturally occurring chiral molecules.

We claim:

1. A ferroelectric smectic liquid crystal mixture in which a first constituent of the mixture is chiral, which first constituent is admixed with a second constituent which exhibits a tilted smectic C phase, and wherein the said first constituent consists of one or more compounds having a molecular structure in which the chiral group of the molecule is sterically hindered with respect to the main molecular core, said compound(s) having a molecular structure:

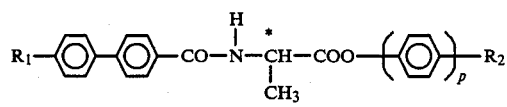

wherein $R_1$ is n-alkyl or n-alkoxy containing 5-12 carbon atoms, p is 0 or 1, $R_2$ is $C_1$-$C_4$ n-alkyl or n-alkoxy, provided that if p is 0, then $R_2$ is $C_1$-$C_4$ n-alkyl.

2. A mixture as claimed in claim 1 wherein the extent of the steric hindrance is such that the first contituent produces, in the mixture, an extrapolated spontaneous polarisation (Ps) with a maximum value that exceeds 10 n Ccm$^{-2}$.

3. A mixture as claimed in claim 2 wherein the maximum value of Ps is greater than 20 n Ccm$^{-2}$.

4. A mixture as claimed in claim 1 wherein the said first constituent has a structure:

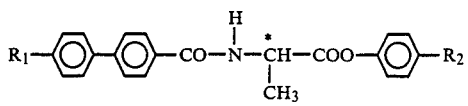

wherein $R_1$ is n-alkoxy and $R_2$ is n-alkoxy.

5. A mixture as claimed in claim 4 wherein $R_2$ is n-butyloxy.

6. A mixture as claimed in claim 4 or 5 wherein $R_1$ is n—$C_8H_{17}O$—.

7. A mixture as claimed in claim 1 wherein the said first constituent has a structure:

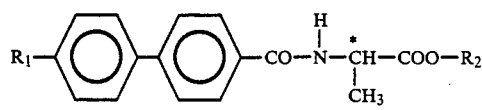

wherein $R_1$ is n-alkoxy and $R_2$ is n-alkyl.

8. A mixture as claimed in claim 7 wherein $R_2$ is ethyl.

9. A mixture as claimed in claim 7 or 8 wherein $R_1$ is n—$C_8H_{17}O$— or n—$C_9H_{19}O$—.

10. A liquid crystal electro-optic display device comprising two substrates defining inner surfaces, at least one of said substrates being optically transparent, electrodes on the inner surfaces of the substrates and a layer of a liquid crystal material sandwiched between the substrates, wherein the liquid crystal material is a ferroelectric smectic liquid crystal mixture in which a first constituent of the mixture is chiral, which first constituent is admixed with a second constituent which exhibits a tilted smectic C phase, and wherein the first constituent consists of one or more compounds having a molecular structure in which the chiral group of the molecule is sterically hindered with respect to the main molecular core, said compound(s) having a molecular structure:

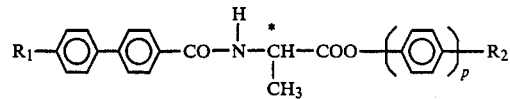

wherein $R_1$ is n-alkyl or n-alkoxy containing 5-12 carbon atoms, p is 0 or 1, $R_2$ is $C_1$-$C_4$ n-alkyl or n-alkoxy, provided that if p is 0, then $R_2$ is $C_1$-$C_4$ n-alkyl.

* * * * *